US012741546B2

(12) United States Patent
Maier et al.

(10) Patent No.: US 12,741,546 B2
(45) Date of Patent: Sep. 22, 2026

(54) POWER SUPPLY OF A DETECTION UNIT

(71) Applicant: SCHUNK TRANSIT SYSTEMS GMBH, Wettenberg (DE)

(72) Inventors: Tobias Maier, Berlin (DE); Tom Nusch, Wettenberg (DE); Dominik Pascal Arnold, Heltersberg (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 86 days.

(21) Appl. No.: 18/722,198

(22) PCT Filed: Dec. 22, 2021

(86) PCT No.: PCT/EP2021/087381
§ 371 (c)(1),
(2) Date: Jun. 20, 2024

(87) PCT Pub. No.: WO2023/117090
PCT Pub. Date: Jun. 29, 2023

(65) Prior Publication Data
US 2025/0083531 A1 Mar. 13, 2025

(51) Int. Cl.
*B60L 9/08* (2006.01)

(52) U.S. Cl.
CPC ............. *B60L 9/08* (2013.01); *B60L 2200/26* (2013.01)

(58) Field of Classification Search
CPC .......... B60L 9/08; B60L 2200/26; B60L 5/32; B60L 9/24; B60L 50/53; B60L 2210/10; B60L 2210/20; B60L 2210/30; B60L 2240/16; B60L 2240/429; B60L 2240/622; B60L 2240/66; B60L 3/0023;
(Continued)

(56) References Cited

FOREIGN PATENT DOCUMENTS

| | | | |
|---|---|---|---|
| DE | 102006015085 | A1 | 9/2007 |
| DE | 102017210750 | A1 | 12/2018 |
| DE | 102018209583 | A1 | 12/2019 |

(Continued)

OTHER PUBLICATIONS

Machine Translation of KR 101725198 B1 PDF File Name: "KR101725198B1_Machine_Translation.pdf" (Year: 2017).*

*Primary Examiner* — Grant Moubry
*Assistant Examiner* — Ruben Picon-Feliciano
(74) *Attorney, Agent, or Firm* — Dickinson Wright PLLC; Andrew D. Dorisio; Nicholas P. Coleman

(57) ABSTRACT

A power supply device for supplying power to a consumer disposed on a rail vehicle is being configured for generating a supply voltage of the consumer from a voltage applied to the conductor. Transmission electronics and a bypass conductor connectable in an electrically conductive manner to the consumer via the transmission electronics are provided and the transmission electronics is switched between the bypass conductor and the consumer and the bypass conductor is connected in an electrically conductive manner to the conductor by means of two fastening interfaces, a potential difference being present between the fastening interfaces and the bypass conductor being designed in such a manner that the bypass conductor generates an output voltage and the transmission electronics being designed in such a manner that the transmission electronics generates the supply voltage of the consumer from the output voltage.

19 Claims, 1 Drawing Sheet

(58) Field of Classification Search
CPC ...... B60L 3/0069; B60L 5/24; B60L 2240/80; B60L 3/12; B61L 15/0081; B61L 25/025
See application file for complete search history.

(56) References Cited

FOREIGN PATENT DOCUMENTS

| | | | | |
|---|---|---|---|---|
| KR | 101725198 B1 * | 4/2017 | .......... B60L 11/1801 |
| WO | 2018179022 A1 | 10/2018 | |

* cited by examiner

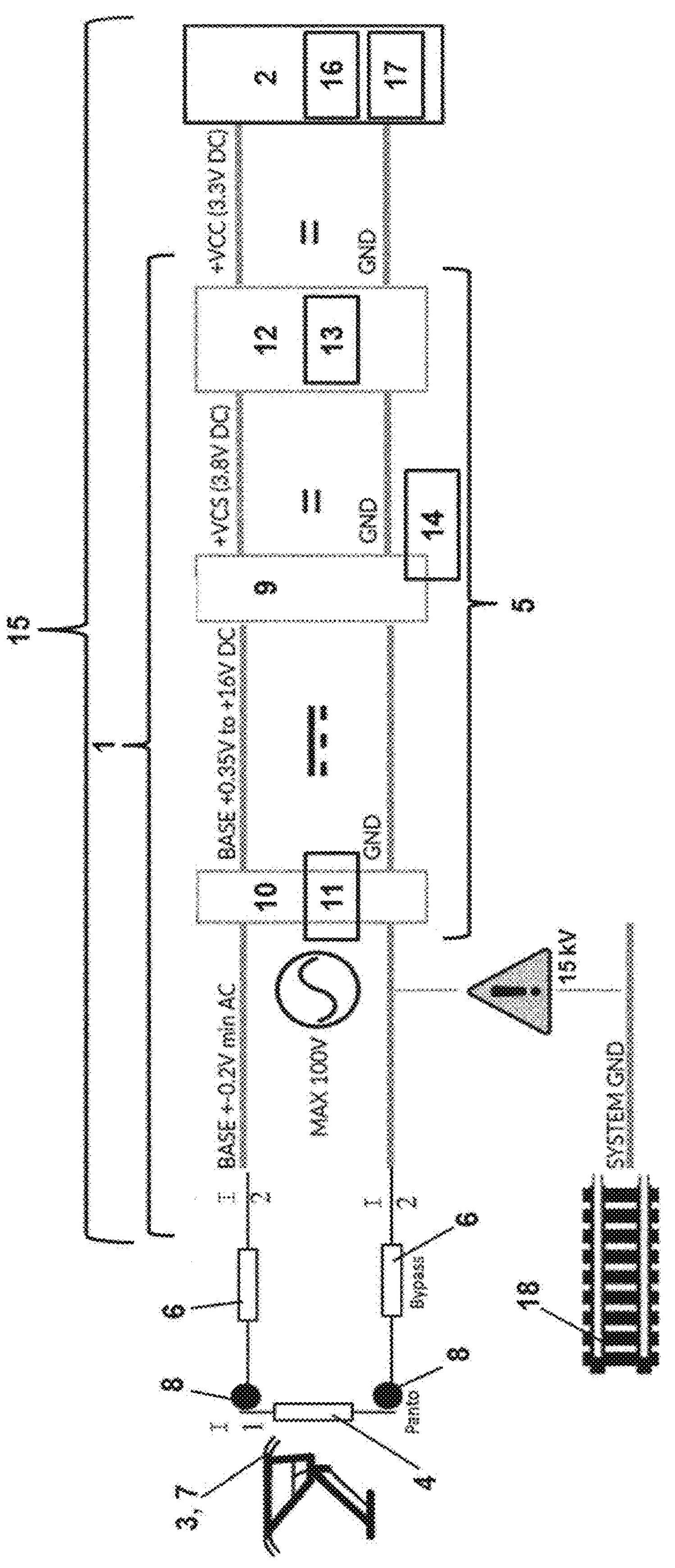
15
1
5
2
16
17
+VCC (3.3V DC)
GND
12
13
+VCS (3.8V DC)
GND
9
14
BASE +0.35V to +16V DC
GND
10
11
BASE +-0.2V min AC
MAX 100V
15 kV
SYSTEM GND
6
6
Bypass
8
8
Panto
4
3, 7
18

POWER SUPPLY OF A DETECTION UNIT

TECHNICAL FIELD

The invention relates to a power supply device for supplying power to a consumer disposed on a rail vehicle, the consumer preferably being an acquisition unit for monitoring rail vehicles, in particular operating units of the rail vehicles, the rail vehicle having at least one conductor and the power supply device being configured for generating a supply voltage of the consumer from a voltage applied to the conductor, transmission electronics and a bypass conductor connectable in an electrically conductive manner to the consumer via the transmission electronics being comprised and the transmission electronics being switched between the bypass conductor and the consumer and the bypass conductor being connected in an electrically conductive manner to a conductor of the rail vehicle, in particular a current collector by means of two fastening interfaces, a potential difference being present between the fastening interfaces and the bypass conductor being designed in such a manner that the bypass conductor generates an output voltage which is lower than the potential difference at the conductor between the fastening interfaces, the transmission electronics being designed in such a manner that the transmission electronics generates the supply voltage of the consumer from the output voltage of the bypass conductor.

BACKGROUND

Furthermore, the invention at hand refers to a monitoring system having an energy supply device and a method for supplying energy to a consumer, in particular an acquisition unit for monitoring rail vehicles.

In principle, devices and methods are known for supplying power to consumers on rail vehicles and for monitoring rail vehicles and/or their operating units. In the known devices and methods, for example, a state of the operating unit is monitored and/or a measured value and/or data are determined by means of a sensor which is attached directly to the rail vehicle and/or an operating unit. For example, a line pressurized with compressed air can be disposed within a contact strip of a roof current collector, the compressed air escaping from the line if the contact strip breaks or is completely worn and the contact strip is lowered by a contact wire. Alternatively, a pressure force of the contact strip against the contact wire, a wind speed or other environmental and operating parameters can be measured by means of an appropriately installed sensor and be used to control the actuation of the roof current collector or another operating unit of the rail vehicle.

Numerous sensors can be used to monitor the operating units, the sensors being able to be powered either by cable or wirelessly. A wired power supply, which draws power directly from a power grid, is usually associated with high material costs and high cabling costs or is ruled out due to the power supply requirements. For example, in mobile applications, such as the use of an acquisition unit with sensors in or on means of transportation, such as trains, cars or aircrafts, a self-sufficient or wireless or off-grid power supply is often preferred to a wired power supply due to the requirements. In addition, in mobile applications, especially when using acquisition units on rail vehicles, a direct connection to the rail vehicle's power supply is not possible or intervention in the present on-board power supply is not desirable. Known acquisition units with sensor systems which have a wireless power supply, i.e. are not directly connected to a power supply, are usually supplied with electrical energy solely via batteries or accumulators. However, this has the disadvantage that the battery has to be replaced or the accumulator recharged regularly, which means that the acquisition unit requires more maintenance. In addition, external influences can severely affect the service life of the batteries or accumulators. For example, temperature fluctuations can lead to faster discharge or, depending on the time of year and/or climatic conditions shorter maintenance intervals may be necessary, especially in cold weather. Especially if the consumer, the acquisition unit or the power supply unit are difficult to access, this is associated with increased effort and is therefore undesirable.

Various local power supplies for sensors are known from the state of the art to enable a power supply for sensors independent of batteries or accumulators. In this context, for example, it is proposed to enable supplying power to a sensor unit by means of induction. For example, it is known from the state of the art to inductively couple a first electrical conductor, which connects an inverter to a motor of a rail vehicle, to a second electrical conductor. The second electrical conductor then generates the operating voltage required to operate the consumer electrically connected to the second electrical conductor. The disadvantage, however, is that this solution can only be used in alternating current networks.

It is therefore the object of the invention at hand to propose a power supply device and a method for locally generating voltage and supplying power to a consumer disposed on a rail vehicle, the power supply device not requiring a battery, an accumulator or a complex cable connection supplying power and being able to be operated both in direct voltage networks and in alternating voltage networks.

A device according to the invention for supplying power to a consumer disposed on a rail vehicle, the consumer preferably being an acquisition unit for monitoring rail vehicles, in particular for monitoring operating units, the rail vehicle having at least one conductor, is configured for generating a supply voltage of the consumer from a voltage applied to the conductor. For supplying power to the consumer, the power supply device comprises transmission electronics and a bypass conductor connectable in an electrically conductive manner to the consumer via the transmission electronics, the transmission electronics being switched between the bypass conductor and the consumer. The bypass conductor is connected in an electrically conductive manner to the conductor of the rail vehicle, in particular a current collector by means of two fastening interfaces. In this context, the fastening interfaces are disposed in such a manner on the conductor, preferably on the current collector, that a, preferably largest possible, potential difference is present between the fastening interfaces, the bypass conductor being designed in such a manner that the bypass conductor generates an output voltage which is lower than the potential difference at the conductor between the fastening interfaces. From this output voltage of the bypass conductor tapped via the bypass conductor, supply voltage of the consumer is generated by means of the transmission electronics. This enables local voltage generation and supply to the consumer, i.e. in the immediate vicinity of the consumer.

SUMMARY

In the context of the invention, a consumer is an electrical consumer. Preferably, the consumer is designed as an acquisition unit. In the context of the invention, the acquisition unit can have a sensor device fixedly disposed on the corresponding operating unit or the rail vehicle. The sensor device can then, for example, comprise a sensor with which, for example, a function of the corresponding operating unit and an operating duration can be determined. If the acquisition unit also comprises a transmission device, it can transmit data sets to a superordinate unit, such as the names of the operating unit or the values detected by the sensor.

In the context of the invention, operating units can be current collector, ground brushes, lubricating devices, contact strips, grinding devices, contact brushes or the like.

In the context of the invention, a current collector can be designed as a roof current collector, a roof charging current collector, an inverted roof charging current collector, an underfloor current collector or a third-rail current collector.

In the context of the invention, a conductor is any electrical conductor, for example a cable, to which a bypass conductor can be connected in an electrically conductive manner and at which a voltage drop occurs which is large enough to supply a consumer with the supply voltage required to operate the consumer. Preferably, the conductor is a main current conductor. In the context of the invention, a main current conductor relates to a conductor which supplies the rail vehicle with current from a superordinate power grid. Preferably, the conductor connects the motor of the rail vehicle to a current transfer point, which is formed, for example, between a current collector and a catenary supplied with high voltage. A current collector can thus comprise a part of the main current conductor and/or at least one conductor of a rail vehicle. The main current conductor also preferably supplies components of the rail vehicle, such as the drive motor of the rail vehicle, with high voltage. A catenary commonly used in Germany is at a high-voltage potential of 15 kV with respect to the ground potential. However, it is also conceivable to operate the device according to the invention in other known traveling current networks. Depending on the type of power supply, i.e., direct current or alternating current, and the voltage applied, rail vehicles with an electrical output in the range of several MW draw electrical currents of up to several 1000 A from a catenary of this kind. This supply to the rail vehicle takes place from the transfer point by means of the main conductor and a distribution system connected thereto, which can include a large number of conductors. In order to prevent damage due to the high potential difference, especially when disposed on the roof of a rail vehicle, the power supply device and/or the consumers can be operated isolated on the conductors, in particular on the main conductor, without having an electrical connection to the rail vehicle body.

The fastening interfaces serve for the electrically conductive fastening of the bypass conductor to the conductors, preferably to the main conductor, of the rail vehicle, a potential difference being present between the fastening interfaces and being used by the bypass conductors to generate an outlet voltage lower than the potential difference at the conductor between the fastening interfaces. The bypass conductor is preferably disposed along a section of the conductor, preferably on a current collector, a contact strip, a sliding device or a contact brush. The resistance of the bypass conductor can be changed in this context meaning the outlet voltage transmitted to the transmission electronics can be changed. For example, the resistance of the bypass conductor can be adjusted on the basis of the conductor length, the conductor material and/or the conductor cross section. In the context of the invention, it has been recognized that the resistance of the bypass conductor and the voltage drop during current consumption by the consumers correlate. In this context, it has further been recognized that the resistance of the bypass conductor should be as low as possible so that the voltage drop across the bypass conductor is as low as possible when the consumers draws current. The potential difference between the fastening interfaces can also be varied, for example by changing the distance or the length of the bypass conductor between the two fastening interfaces. The bypass conductors and the fastening interfaces are also preferably disposed at high-voltage potential.

It is also conceivable that one fastening interface is sufficient to generate an outlet voltage at the bypass conductors, which is used to generate the supply voltage of the consumer, provided the consumer is connected in an electrically conductive manner to the base frame of the rail vehicle and thus the consumers itself serves as the second fastening interface.

The power supply device according to the invention can also be used to supply a plurality of consumers with energy. Thus, the power supply device according to the invention can also be used to supply a plurality of acquisition units, which acquire data at different points of a rail vehicle, with energy and can thus be operated without a battery or accumulator. In the context of the invention, a battery is a storage device for electrical energy which is completely stored in electrochemical form in a battery. In the context of the invention, an accumulator is a rechargeable battery.

The transmission electronics is designed in such a manner that the transmission electronics generates the supply voltage of the consumer from the outlet voltage of the bypass conductor. Thus, the transmission electronics according to the invention makes it possible to adapt the outlet voltage of the bypass conductor in such a manner that the consumers can be supplied with voltage without damaging the consumers itself or impairing the operation of the consumer. This is because the outlet voltage of the bypass conductor can, for example, be subject to voltage fluctuations and/or have voltage peaks which should not be passed on to the consumers in the course of supplying the consumer. With the power supply device according to the invention, it is thus possible to supply a consumer with electrical energy in a simple and reliable manner without having to use batteries or accumulators susceptible to maintenance. By attaching a simple additional conductor, which acts as a bypass conductor, to the conductors, a complex structure and complex cabling or cabling not possible due to different potentials are also avoided. A further advantage of the power supply device according to the invention is that the power supply device can be operated in both direct voltage and alternating voltage networks, as the bypass conductors can tap alternating voltage or direct voltage. The fact that the power supply device, in particular the bypass conductors, is connected directly to the conductors via fastening interfaces, preferably at high-voltage potential, also means that no intervention in the rail vehicle's internal electrical system is necessary, which enables universal use on different rail vehicles regardless of the rail vehicle operator.

It is conceivable that the outlet voltage of the bypass conductor is used unchanged by means of the transmission electronics as the supply voltage for supplying the consumer. According to a preferred embodiment, however, the transmission electronics can also have a component for current or voltage transformation, by means of which the outlet voltage of the bypass conductor is transformed so that the outlet voltage of the bypass conductor and the supply voltage of the consumer differ. In the context of the invention, a component for current or voltage transformation can be designed as a component for current or voltage limitation or as a component for current or voltage reduction or as a component for current or voltage increase. A component for voltage transformation can, for example, be an AC voltage converter or a DC voltage converter. A DC/DC converter is an electrical circuit that converts a DC voltage supplied to the input into a DC voltage with a higher, lower or inverted voltage level. In the context of the invention, an AC voltage converter is an electrical component which converts an AC input voltage, which is present at the input of the AC voltage converter, into an AC output voltage, which can be tapped at the output of the AC voltage converter. The outlet voltage of the AC voltage converter can be less than, greater than or equal to the inlet voltage of the AC voltage converter. The voltage is preferably increased using a boost converter whose outlet voltage is always greater than its inlet voltage. The outlet voltage of the bypass conductor is preferably reduced using a buck converter whose outlet voltage value is always less than its inlet voltage value. For example, an inlet voltage of the component for voltage transformation of between 0.35 V and 16 V can be converted into an outlet voltage of 3.8 V by means of the component for voltage transformation. In this manner, the supply voltage of the consumer can be provided reliably and advantageously. Preferably, the component for voltage transformation provides a DC voltage. Further preferably, the component for voltage transformation provides a low voltage of 3.8 V. Most preferably, the component for voltage transformation provides a DC voltage of 3.8 V. The voltage transformation can take place before or after rectification independently of rectification.

The transmission electronics can have a component for rectification. The component for rectification can rectify an AC voltage tapped from the bypass conductor and subsequently supply a DC voltage to the consumer as the supply voltage. Known rectifiers can be used as components for rectification. Semiconductor rectifiers are preferred. Alternatively or in addition to a component for rectification, the transmission electronics can have a component for current or voltage limitation. Such a component for current or voltage limitation allows protection against overvoltage or excessive currents in a simple manner. This ensures that downstream components of the transmission electronics or the consumer are not damaged or impaired in their function by overvoltage or excessive currents. Electrotechnical components such as suppressor diodes or varistors, which provide discrete overvoltage protection, can be used as voltage limiting components. Preferably, however, an active limiter is used as a component for current or voltage limitation. Such an active limiter continuously measures the voltage or the current on the supply line of the active limiter and isolates the downstream elements in the event of overvoltage and/or excessive current flow. An active voltage limiter is particularly preferred.

If the conductor is supplied by an AC voltage network, i.e., AC voltage is present at the conductor and at the bypass conductor, the outlet voltage of the bypass conductor, which is present as AC voltage, must be rectified before being fed to the consumer, which preferably occurs using an active limiter in combination with a rectifier. If the conductor of the rail vehicle is supplied by a DC voltage network, i.e., DC voltage is applied to the conductor and the bypass conductor, the outlet voltage of the bypass conductor does not need to be rectified, as the DC voltage required to supply the consumer is already present, which means the component for rectification in the transmission electronics can be dispensed with. Since the transmission electronics has a component for rectification and/or a component for current or voltage limitation, the power supply device according to the invention can be used both on rail vehicles which are operated in DC voltage networks and on rail vehicles which are operated in AC voltage networks.

The transmission electronics of the power supply device can be designed in such a manner that the transmission electronics has a charging electronics, which has at least one component for energy storage, preferably at least one capacitor. The energy storage can be used to bridge the times when the voltage drop at the bypass conductor is too low or non-existent and therefore the bypass conductor does not provide an outlet voltage to generate a supply voltage for the consumer. This ensures the consumer can be operated reliably even during an insufficient supply from the bypass conductor, for example during downtimes in the train depot or during short braking phases during operation. The preferred component for energy storage is a capacitor which is supplied via the charging electronics. Even more preferably, a so-called supercapacitor, which is supplied via the charging electronics, is used as an component for energy storage. It is also conceivable that a component for voltage transformation and/or a component for rectification and/or a component for current or voltage limitation are also supplied with power from the energy storage device. It is also conceivable that when the energy storage system is completely discharged, the system is supplied by an additional emergency battery which can be replaced if necessary. However, as this emergency battery is only used in exceptional cases, its maintenance and replacement intervals are comparatively long.

The power supply device can have a monitoring electronics for monitoring the component for voltage transformation, in particular a voltage transformer. The component for voltage transformation can be initially ignited via a pulse preferably generated by the component for energy storage. The monitoring electronics for monitoring the component for voltage transformation monitors in particular the initial ignition of the component for voltage transformation, preferably a voltage transformer, and prevents unnecessary ignition processes, for example if an outlet voltage of the bypass conductor is unstable. In this manner, the monitoring electronics contributes to the safe operation of the consumer and prevents unnecessary discharging of the component for energy storage by preventing unnecessary ignition processes.

The bypass conductor can be designed predominantly in the form of a straight electrical conductor. In other words, this means the bypass conductor is preferably an unbranched and/or unwound conductor. This offers the advantage over providing energy by induction that no complexly wound conductor is required to tap a voltage at a conductor. The bypass conductor is also preferably designed as a wire or stranded wire, meaning the bypass conductor can be manufactured in a simple manner from standardized cables or wires available on the market.

The input resistance of the bypass conductor and/or the consumer can be greater than the internal resistance of the conductor. This means that, advantageously, a lower current flows through the bypass conductor, resulting in a significantly lower voltage. Preferably, a voltage drop between the two fastening interfaces of maximally 100 V is generated via the internal resistance of the conductor, while a voltage of at least 0.2 V, but no more than 16 V, is generated at the bypass conductor.

It has proven to be advantageous if the potential difference between the fastening interfaces is maximally 100 V. Since the potential difference between the current transfer point of the conductor, in particular a main current conductor, for example the contact point between the current collector and the catenary and ground potential, is regularly several 1000 V, preferably 15 kV, it may be necessary to tap a lower voltage between the two fastening interfaces by means of the bypass conductor in order to avoid damaging the power supply device and the consumer. To avoid such damage, it is conceivable to dispose the fastening interfaces in such a manner on the conductor that the potential difference between the fastening interfaces is maximally 100 V and therefore the voltage which can be tapped by the bypass conductor is also maximally 100 V. Preferably, an outlet voltage of the bypass conductor between 0.1 V and 4 V, even more preferably 0.4 V, is generated via the bypass conductor.

The supply voltage of the consumer, which can be provided by the transmission electronics connected downstream of the bypass conductor, is preferably 3.3 V. If charging electronics are provided, their inlet voltage is preferably 3.8 V and the inlet voltage of the component for voltage transformation is preferably 0.35 V to 16 V. Since the supply voltage must be adapted to the consumer's requirements, it is also conceivable that if the voltage which can be tapped at the bypass conductor and is lower than the supply voltage required to supply the consumer is comparatively low, an increase in the voltage tapped at the bypass conductor is necessary.

To bridge an insufficient supply of electrical energy to the conductor and thus an insufficient supply to the consumer, the power supply device can include an power generation unit. It is conceivable that the power generation unit is designed as a fuel cell, a photoelectric generator, a piezoelectric generator, a kinetic generator and/or a thermoelectric generator. For example, energy from various energy sources such as wind power, photovoltaics, dynamic pressure, kinetic energy, for example due to movement of an operating unit or a component of an operating unit, temperature gradients or pressure changes, can be used to provide energy to the consumer by means of the power generation unit. The power supply device can have an power generation unit in addition to the bypass conductor. However, it is also conceivable that the power supply device consists only of a power generation unit and transmission electronics, without a bypass conductor being included in the power supply device, so that completely self-sufficient operation is possible without being dependent on an external power grid.

The monitoring system according to the invention has at least one power supply device according to the invention and a consumer designed as an acquisition unit and serving to monitor rail vehicles, in particular for monitoring operating units, data being able to be recorded for various attributes of the corresponding operating units by means of the acquisition unit. Operating units of rail vehicles to be monitored by the acquisition unit can be, for example, current collectors, ground brushes, lubricating devices, contact strips, sliding devices, contact brushes, shaft ground systems or the like. In this context, an attribute is understood to be an object-specific property of an operating unit; the attributes can be selected from the attribute types type, identification, year of manufacture, vehicle, use, running time, material, wear, fault, damage, location, image, sound, recording time or the like of the operating unit. In the context of the invention, data is understood to mean attribute values, such as an actual measured value for recording the wear of an operating unit. The data can be, for example, a designation, a serial number, a year, a date, a vehicle type designation, a measured value, a fault description, a damage description, a position specification, an image file, a sound file, a time, a time period or the like.

If the operating unit is a roof current collector and/or a pantograph, the following attributes can preferably be used: type of collector strip, material of the collector strip, initial height and wear height, running time of the vehicle in kilometers, running time of the current collector in kilometers, wear specification in millimeters for a first collector strip, wear specification in millimeters for a second collector strip.

If the operating unit is a third-rail current collector, the following attributes can preferably be used: type of fuse, type of collector strip, material of the collector strip, initial height and wear height, running time of the vehicle in kilometers, running time of the current collector in kilometers, wear specification in millimeters for the collector strip.

If the operating unit is a ground brush, the following attributes can preferably be used: collector ring material, brush material, brush cross section, initial height and wear height, running time of the vehicle in kilometers, running time of the ground brush in kilometers, wear specification in millimeters for several carbon brushes.

If the operating unit is a shaft ground system, the following attributes can preferably be used: parallel-feed material, fiber material, fiber cross section, initial cross section and wear height, running time of the vehicle in kilometers, running time of the ground system in kilometers, wear specification in millimeters for a first fiber and a second fiber.

If the operating unit is a wheel flange lubrication system, the following attributes can preferably be used: lubricating pin material, initial length and wear length, running time of the vehicle in kilometers, running time of the lubricating pin in kilometers, wear specification in millimeters.

The monitoring system according to the invention can also be used to monitor rail vehicles having several operating units of the same and/or different types. It is conceivable for the monitoring system to also have a plurality of acquisition units for recording data from the operating units. The plurality of acquisition units can each be connected to a separate power supply device or an individual power supply device can supply a plurality of acquisition units with power.

Advantageously, the data recorded by the acquisition units for different attributes of an operating unit can be assigned to these attributes. The data can be represented by values, characters or files. Together with the assigned data, the attributes form data sets which can be transmitted from the respective acquisition units to a monitoring unit. The monitoring unit can be part of the monitoring system or belong to a another system as a superordinate and/or secondary unit. It is conceivable that the monitoring system has several acquisition units, whose data sets are transmitted to at least one individual monitoring unit and are merged in this unit, several monitoring units also being able to be present, for example for different applications. The data sets can be stored in a database of the monitoring unit and be processed continuously or as required by an evaluation device of the monitoring unit. The monitoring unit and/or the evaluation device can be formed by a computer with a software application installed thereon. In order to correlate the data sets with each other, a pattern analysis of the data sets can be carried out by means of the evaluation device and output using an output device, for example a screen. The pattern analysis makes it possible to determine an interrelationship between data sets, provided one exists. In turn, causal relationships can be regularly derived from the correlations, the causal relationships being able to be used to optimize the operation of the monitored rail vehicles. For example, an occurrence of a fault on a certain type of operating unit can correlate with a certain type of rail vehicle. This makes it possible to determine the cause of the fault and/or the cause-effect relationship between the rail vehicle and the fault and to eliminate it in a targeted manner.

The monitoring system can comprise an acquisition unit which has a sensor device fixedly disposed on the corresponding operating unit or the rail vehicle. The sensor device can then, for example, comprise a sensor with which a function of the corresponding operating unit and an operating time can be determined. For example, the sensor device can be used to record data relating to the wear of a component of an operating unit.

Preferably, the sensor device is used to detect the wear of a current collector, more preferably a contact strip of a current collector.

The acquisition unit of the monitoring system can have a transmission device fixedly disposed on the corresponding operating unit or the rail vehicle. This transmission device can then transmit datasets, in particular data recorded by a sensor device, preferably to a monitoring unit. For example, the transmission device can transmit a data set consisting of the type designation of the operating unit and a value determined by the sensor as well as an operating time. The transmission device then assigns the data recorded for the sensor to the corresponding attributes. It may also be the case that the transmission device already stores data sets which are transmitted, such as a serial number or a year of manufacture of the operating unit or of the rail vehicle. The data can be transmitted via a data connection. In principle, the data connection can be formed by a cable connection. Furthermore, the data connection can be a radio connection or another suitable type of data connection. The data connection can be established continuously, at regular intervals or event-based. Overall, this makes it possible to use the transmission device to transmit data sets of the operating units, regardless of the type of data connection, for example for evaluation. It is conceivable that the data connection is established via an external network. The data connection can be established via a mobile network, WLAN, a satellite connection, the Internet or any other wireless standard, either on its own or in combination. The destination of the data transmitted by the transmission device, for example a monitoring unit or evaluation device, can then also be spatially distanced from the operating units, the rail vehicles and/or the transmission device. In particular, this makes it possible to centrally evaluate data sets of a rail vehicle.

The acquisition unit of the monitoring system according to the invention can have a time sensor and a position sensor, making it possible to determine an acquisition time and a local position of the corresponding operating unit. The acquisition time and the local position can also each be stored as a data set in a database. The local position can, for example, determine a position of the rail vehicle and/or the relevant operating unit via satellite navigation. This makes it possible, among other things, to determine at which point on a route a particular data set was recorded. This makes it possible to assign the relevant local position to an event and/or the data set recorded at this point in time. If a pattern analysis is carried out, correlations can then be established, for example, between the local position recorded in the acquisition time and any errors detected in the operating units. For example, a comparatively increased wear or a specific fault on the operating unit can then be assigned to a season or a route.

The monitoring system according to the invention, in particular the acquisition unit, can have an energy meter. This energy meter is preferably designed as a current measuring device and/or voltage measuring device. The bypass conductor is also preferably used to measure the voltage dropping at the conductors, which is proportional to the current via the resistance of the conductor, the current in turn allowing to draw conclusions regarding the energy via the mains voltage, in particular via the mains voltage of the catenary. The energy meter can be used, for example, to detect the traveling current applied to the main conductor and/or the voltage tapped by the bypass conductors and/or the amount of electrical energy fed back into the network by the rail vehicle and/or the electrical energy transmitted by the bypass conductors to the transmission electronics and/or the electrical energy transmitted by the bypass conductors to the acquisition unit. In addition, such an energy meter can be used to detect arcing, i.e., to detect electrical arcs, for example between the catenary and the contact strip of a current collector, due to voltage changes, in particular due to a strong voltage drop. Moreover, a travel profile of the rail vehicle can be recorded and modeled by evaluating the energy yield. The measurement of the traveling current, i.e., the current flowing through the main conductor, is preferably carried out by recording the negative half-wave in alternating current networks and/or by a high-impedance voltage measurement circuit.

It is also conceivable that the energy measuring unit comprises an unloaded bypass conductors, which enables precise measurement of the voltage or current. In this context, an unloaded bypass conductors refers to a bypass conductor from which no current flows, for example due to the consumption of a consumer. This can be occur by temporarily switching the bypass conductors to be load-free, in particular for the duration of the measurement. Alternatively or additionally, it is conceivable that the energy measurement unit is designed as another bypass conductors without load in addition to the one for supplying power to the acquisition unit.

The monitoring system can comprise at least one operating unit. The monitoring system can also comprise several operating units, whose data can be stored as data sets in a database. The operating units can be connected to a superordinate evaluation device via the acquisition unit and/or a transmission device with a data connection. For example, the monitoring system can have a current collector, a ground brush, a lubricating device, contact strips, sliding devices or contact brushes as operating units. Preferably, the monitoring system comprises a current-carrying operating unit, such as a current collector, a sliding device or contact brushes. Particularly preferably, the monitoring system comprises a current collector as an operating unit, on which the bypass conductors of the power supply device is disposed. The monitoring system can also comprise a plurality of acquisition units for monitoring several current collectors.

In the method according to the invention for supplying power to a consumer disposed on a rail vehicle, in particular an acquisition unit for monitoring rail vehicles, in particular for monitoring operating units, a first voltage is applied to a conductor of a rail vehicle, in particular to a current collector, by generating a current flow through a conductor, and a second voltage is tapped at the conductors between two fastening interfaces as the outlet voltage of the bypass conductor by means of a bypass conductor, the outlet voltage of the bypass conductor being used to supply power to the consumer.

In principle, in order to avoid unnecessary repetition with regard to the features, properties and advantages of the method according to the invention, reference should be made to the above disclosure of the power supply device according to the invention and the monitoring system according to the invention. This means that, in principle, features disclosed and described in terms of the method are to be regarded as described and claimable in terms of the device, and vice versa.

Preferably, the consumer is designed as an acquisition unit and the acquisition unit, which can be supplied with power by the power supply method according to the invention, is used to monitor current collectors, ground brushes, lubricating devices, contact brushes, sliding devices, contact brushes or the like.

The bypass conductor is disposed in such a manner on the conductors, preferably on the main conductor, that the bypass conductors taps voltage from the conductors via a section of the conductor and generates an outlet voltage of the bypass conductor for the consumer's power supply. The voltage tapped by the bypass conductors depends on the potential difference between the fastening interfaces, for which reason the tapped voltage can be varied by adjusting the length of the bypass conductor and the distance between the fastening interfaces. It is also conceivable that the outlet voltage of the bypass conductor and/or the current flowing through the bypass conductors can be varied by changing the resistance of the bypass conductor. In order to use the outlet voltage of the bypass conductor for the power supply of a consumer, the outlet voltage of the bypass conductor can be used directly as the supply voltage of the consumer or be fed to transmission electronics by means of which the outlet voltage of the bypass conductor is converted, modified, stabilized and/or the electrical energy transmitted by the bypass conductor is stored.

Advantageously, the supply voltage required by the consumer is generated by voltage transformation of the outlet voltage. This can take place in the transmission electronics. Components for voltage transformation, such as a voltage converter or a voltage transformer, are preferably used for voltage transformation. The step of transforming voltage makes it possible to reliably provide the required supply voltage for the consumer. In the context of the invention, the term "transforming the outlet voltage of the bypass conductor" refers to limiting or reducing or increasing the outlet voltage of the bypass conductor. By limiting or reducing the voltage, it can be ensured that the consumer is not damaged by voltage peaks or the like. However, it is also conceivable to increase the outlet voltage. The outlet voltage of the bypass conductor is preferably increased using a boost converter whose outlet voltage is always greater than its inlet voltage. The outlet voltage of the bypass conductor is preferably reduced by using a buck converter, whose outlet voltage is always less than its inlet voltage. The voltage transformation can take place before or after rectification, irrespective of rectification.

The outlet voltage of the bypass conductor can be rectified. Rectification makes it possible to supply the consumer with DC voltage, regardless of whether the conductor is operated in an AC or a DC network. Preferably, the outlet voltage of the bypass conductor is rectified and then subjected to a voltage transformation. It is further preferred that the outlet voltage of the bypass conductor is limited and rectified and then subjected to a voltage transformation.

The supply voltage of the consumer can be provided at least temporarily by at least one component for energy storage. This offers the advantage that the consumer, in particular an acquisition unit, can be supplied from the energy storage unit regardless of faults or failures in the supply to the conductor. Preferably, a voltage tapped at the bypass conductor is rectified and/or limited and the electrical energy is then supplied to an component for energy storage, with the component for energy storage providing the supply voltage required to supply the consumer.

As part of the method according to the invention, the traveling current can be determined and/or arcs can be detected and/or a travel profile can be recorded. If the fastening interfaces on the conductor, via which the bypass conductor is disposed on the conductor, preferably on the main conductor, are known, the potential difference between them can also be inferred and the traveling current and the current and/or voltage curves on the conductor can be determined via the potential difference and the properties of the bypass conductor. Due to the characteristics of an arc, arc detection is possible in a simple manner by determining the voltage at the bypass conductor. For when an arc occurs, for example between the contact strip of a current collector and the catenary, characteristic voltage changes and/or a reduction in the current flow through the bypass conductor can be detected. This means that the undesired occurrence of arcing can be detected and appropriate measures can be taken to service the supply network and/or the rail vehicle, in particular the current collector. As the energy consumption via the main conductor from the supply network correlates with the energy yield of the bypass conductor, a travel profile of the rail vehicle can be derived from the energy yield of the bypass conductor. In particular, acceleration and braking processes of the rail vehicle can be linked with time and/or position data within a travel profile, for example to improve route expansion, route maintenance or route simulations. The data required for the travel profile, in particular data relating to braking processes and/or acceleration processes, can be derived from the energy yield of the bypass conductor in a simple manner, as an acceleration process, in which the main conductor transmits an increased amount of energy, can be presumed when the energy yield of the bypass conductor is increased, and the energy yield is lower during a braking process, as the main conductor only transmits a small amount of energy.

Further advantageous embodiments of the method are derived from the description of the features of the dependent claims relating to device claim 1 and the dependent claims relating to device claim 10.

BRIEF DESCRIPTION OF THE DRAWING

In the following, a preferred embodiment of the invention is explained in more detail with reference to the attached drawing.

FIG. 1 shows a schematic representation of a monitoring system according to the invention with a power supply device disposed on a current collector.

DETAILED DESCRIPTION

FIG. 1 shows a schematic representation of a monitoring system 15 with a power supply device 1 together with a current collector 7 designed as a pantograph and comprising a part of a conductor of a rail vehicle designed as a main conductor 4. The transmission electronics 5 is used to transmit the electrical energy from the bypass conductor 6 to the consumer in the form of an acquisition unit 2. Not shown here is the catenary to which the current collector 7 is connected via the contact strip of the current collector 7 to supply the rail vehicle with power from the supply network. Also not shown is the rail vehicle, on whose roof the current collector 7 is disposed and which can be moved on the rails 18, which also form the ground of the system. FIG. 1 also shows that the fastening interfaces 8 of the power supply device 1 are disposed in such a manner on the current collector 7 that there is a maximum potential difference of 100 V between the fastening interfaces 8. In contrast, there is a potential difference of 15 kV between the current transfer point, i.e., the point at which the contact strip of the current collector 7 and the catenary (not shown) touch, and the ground potential. The bypass conductor 6 generates a voltage of at least 0.2 V, preferably 0.4 V, via the electrical bypass line with a lower current flow than in the main conductor 4. According to the embodiment shown, the bypass conductor 6 generates an alternating voltage. This AC voltage is rectified with the component for rectification 10, the voltage also being limited with the aid of an active limiter 11. A voltage of 3.8 V is generated from the outlet voltage of the component for rectification 10, which can be between 0.35 V and 16 V, with the aid of the component for voltage transformation 9, in this case a voltage converter. The capacitors used as component for energy storages 13 are supplied via charging electronics 12, so that the acquisition unit 2 can be supplied with the necessary supply voltage of 3.3 V even when the rail vehicle is at a standstill or during braking phases in operation, when the voltage drop on the bypass conductor 6 is too low. FIG. 1 thus shows an embodiment in which the current flows from the bypass conductor 6 through a component for rectification 10 and a voltage limitation component 11, then through a component for voltage transformation 9 and the charging electronics 12 to the acquisition unit 2. Owing to the shown design of the power supply device, the acquisition unit 2 can be safely and reliably supplied with the DC voltage required to operate the acquisition unit 2 via an AC voltage tapped at the current collector 7. In addition to the acquisition unit 2, the active limiter 11, the rectifier 10 and the voltage converter 9 are also supplied via the component for energy storage 13 of the charging electronics 12. The initial ignition of the voltage converter 9 is generated via a pulse whose energy requirement is also covered by the component for energy storage 13. In order to avoid unnecessary discharging of the component for energy storage 13, monitoring electronics 14 is provided which monitors the ignition of the voltage converter 9 and prevents unnecessary ignition processes, for example when the bypass voltage is unstable. The acquisition unit 2 has a sensor device 16 fixedly disposed on the rail vehicle and serving to monitor an operating unit 3, in this case a current collector 7, the acquisition unit 2 being used to record data for various attributes of the current collector 7. The data can be transmitted to an evaluation device (not shown), using the transmission device 17. For example, the condition of the contact strip of the current collector 7 can be determined and maintenance and/or replacement of the contact strips can be carried out in good time.

The invention claimed is:

1. A power supply device (1) for supplying power to an acquisition unit (2) disposed on a rail vehicle for monitoring operating units (3) of the rail vehicle and for monitoring a route of the rail vehicle, the rail vehicle having at least one conductor (4) and the power supply device (1) being configured for generating a supply voltage of the acquisition unit (2) from a voltage applied to the conductor (4), wherein a current collector (7) of the rail vehicle comprises the conductor (4), and wherein transmission electronics (5) and a bypass conductor (6) connectable in an electrically conductive manner to the acquisition unit (2) via the transmission electronics (5) are provided and the transmission electronics (5) is switched between the bypass conductor (6) and the acquisition unit (2) and the bypass conductor (6) is connected in an electrically conductive manner to the conductor (4) of the current collector (7), by means of two fastening interfaces (8), a potential difference being present between the fastening interfaces (8) and the bypass conductor (6) being designed in such a manner that the bypass conductor (6) generates an output voltage which is lower than the potential difference at the conductor (4) of the current collector (7) between the fastening interfaces (8), the transmission electronics (5) being designed in such a manner that the transmission electronics (5) generates the supply voltage of the acquisition unit (25) from the output voltage of the bypass conductor (6).

2. The power supply device according to claim 1, wherein the transmission electronics (5) has a component for voltage transformation (9).

3. The power supply device according to claim 1, wherein the transmission electronics (5) has a component for rectification (10).

4. The power supply device according to claim 1, wherein the transmission electronics (5) has charging electronics (12) comprising at least one component for energy storage, preferably at least one capacitor (13).

5. The power supply device according to claim 1, further including monitoring electronics (14) for monitoring the component for voltage transformation (9).

6. The power supply device according to claim 1, wherein the bypass conductor (6) is designed in the manner of a straight electric conductor.

7. The power supply device according to claim 1, wherein the input resistance of the bypass conductor (6) or the acquisition unit (2) is greater than the internal resistance of the conductor (4).

8. The power supply device according to claim 1, further including a power generation unit selected from the group consisting of a fuel cell, a photoelectric generator, a piezoelectric generator, a kinetic generator and/or a thermoelectric generator.

9. A monitoring system (15) having a power supply device (1) according to claim 1 and a consumer designed as an acquisition unit (2) and serving to monitor operating units (3) of the rail vehicle and a route of the rail vehicle, data being acquired for different attributes of the corresponding operating units (3) by means of the acquisition unit (2).

10. The monitoring system according to claim 9, wherein the acquisition unit (2) has a sensor device (16) fixedly disposed on a corresponding operating unit (3) or the rail vehicle.

11. The monitoring system according to claim 9, wherein the acquisition unit (2) has a transmission device (17) fixedly disposed on a corresponding operating unit (3) or the rail vehicle (11).

12. The monitoring system according to claim 9, wherein the acquisition unit (2) has a time sensor and a position sensor so that an acquisition time and a location of the corresponding operating unit (3) is determinable.

13. The monitoring system according to claim 9, wherein the monitoring system, in particular the acquisition unit (2), has an energy meter.

14. The monitoring system according to claim 9, wherein the monitoring system (15) comprises at least one operating unit (3).

15. A method for supplying power to an acquisition unit (2) disposed on a rail vehicle, the acquisition unit (2) serving to monitor operating units (3) of the rail vehicle and a route of the rail vehicles, comprising applying a first voltage to a conductor (4) of a current collector (7) of the rail vehicle by a current flow through the conductor (4) being generated, and a second voltage being tapped at the conductor (4) between two fastening interfaces (8) disposed on the current collector (7) as an output voltage of the bypass conductor (6) by means of the bypass conductor (6) and the output voltage of the bypass conductor (6) being used for supplying power to the acquisition unit (2).

16. The method for supplying power according to claim 15, comprising generating the supply voltage required by the acquisition unit (2) by the voltage transformation of the outlet voltage of the bypass conductor (6).

17. The method for supplying power according to claim 15, comprising rectifying the output voltage of the bypass conductor (6).

18. The method for supplying power according to claim 15, comprising providing the supply voltage of the acquisition unit (2) by at least one component for energy storage (12).

19. The method according to claim 15, comprising detecting and recording the traveling current or electric arcs or a traveling.

* * * * *